US009893945B2

United States Patent
Hsieh et al.

(10) Patent No.: US 9,893,945 B2
(45) Date of Patent: Feb. 13, 2018

(54) PROCESS SYSTEM FOR CONSTRUCTING NETWORK STRUCTURE DEPLOYMENT DIAGRAM AND METHOD THEREOF AND COMPUTER PROGRAM PRODUCT STORING ANALYSIS PROGRAM OF NETWORK STRUCTURE DEPLOYMENT

(71) Applicant: Xinguard Inc., Taipei (TW)

(72) Inventors: Wei-Shan Hsieh, Taipei (TW); Jyh-Kae Hsu, Taipei (TW)

(73) Assignee: XINGUARD INC., Taipei (TW)

( * ) Notice: Subject to any disclaimer, the term of this patent is extended or adjusted under 35 U.S.C. 154(b) by 701 days.

(21) Appl. No.: 14/243,555

(22) Filed: Apr. 2, 2014

(65) Prior Publication Data
US 2015/0127760 A1 May 7, 2015

(30) Foreign Application Priority Data
Nov. 5, 2013 (TW) .............................. 102140190 A

(51) Int. Cl.
*H04L 12/24* (2006.01)
*H04L 12/26* (2006.01)

(52) U.S. Cl.
CPC ............ *H04L 41/12* (2013.01); *H04L 43/026* (2013.01); *H04L 43/10* (2013.01); *H04L 41/0213* (2013.01)

(58) Field of Classification Search
CPC ....... H04L 41/12; H04L 43/026; H04L 43/10; H04L 41/0213; H04L 12/24
USPC ....................................................... 709/207
See application file for complete search history.

(56) References Cited

U.S. PATENT DOCUMENTS

| | | | | |
|---|---|---|---|---|
| 2006/0031488 A1* | 2/2006 | Swales | .............. | H04L 29/12235 709/224 |
| 2006/0092843 A1* | 5/2006 | Iwami | ..................... | H04L 29/06 370/235 |
| 2007/0192501 A1* | 8/2007 | Kompella | ............... | H04L 43/50 709/230 |
| 2007/0201385 A1* | 8/2007 | Goto | ................... | H04L 12/4625 370/254 |
| 2007/0217422 A1* | 9/2007 | Mawatari | ................ | H04L 43/10 370/392 |
| 2009/0049170 A1* | 2/2009 | Schick | ................ | H04L 12/2697 709/224 |

(Continued)

*Primary Examiner* — Ario Etienne
*Assistant Examiner* — Elizabeth Kassa
(74) *Attorney, Agent, or Firm* — Chun-Ming Shih

(57) ABSTRACT

A process system for constructing network structure deployment diagram and the method thereof and a computer program product storing a network structure deployment analysis program are provided to analyze the network structure deployment of a target network. At first, a request instruction is sent by the process system for constructing the network structure deployment diagram to acquire network flow status messages. Interconnection relationship between the connection ports is analyzed by matching the acquired network flow status messages of the connection ports to generate the network structure deployment diagram of the target network. Accordingly, the invention utilizes the flow data messages of the connection ports in the network to create the network structure deployment diagram with advantages of easy implementation and high operation efficiency etc., and is especially suitable for large network systems with a large amount of network terminals.

15 Claims, 6 Drawing Sheets

(56) References Cited

U.S. PATENT DOCUMENTS

| | | | | |
|---|---|---|---|---|
| 2012/0284384 A1* | 11/2012 | Shi | ............... | H04L 41/0893 709/223 |
| 2014/0196115 A1* | 7/2014 | Pelykh | ............... | H04L 63/08 726/4 |
| 2014/0219087 A1* | 8/2014 | Matthews | ............ | H04L 47/2441 370/231 |

\* cited by examiner

PROCESS SYSTEM FOR CONSTRUCTING NETWORK STRUCTURE DEPLOYMENT DIAGRAM AND METHOD THEREOF AND COMPUTER PROGRAM PRODUCT STORING ANALYSIS PROGRAM OF NETWORK STRUCTURE DEPLOYMENT

CROSS-REFERENCE TO RELATED APPLICATIONS

This application claims the priority of Taiwan Patent Application No. 102140190 filed on Nov. 5, 2013, in the Taiwan Intellectual Property Office, the disclosure of which is incorporated herein by reference.

BACKGROUND OF THE INVENTION

Field of the Invention

The present invention is related to a technology of analyzing network structure deployment; more specifically, a process system for constructing network structure deployment diagram by use of the flow status messages of each connection ports on the network and the method thereof and a computer program product storing the analysis program of the network structure deployment.

Descriptions of the Related Art

With the fast development of network technology, network management is becoming more and more complicated. In order to increase the functionality and maneuverability of network facility and service management, quickly and correctly drawing the structure deployment diagram corresponding to the network system can help network manager locate the errors of the network quickly, and improve the whole architecture or specific region of the network. It is the basis to ensure the network managing system to operate in high efficiency, and has gradually become an important factor of network management.

The conventional operation of analyzing network structure deployment is usually sending PING (echo request packets) commands by engineers through a remote computer to each node of the network to check the connection status of each node. However, the defect of the method is that only one network node can be checked at one time. With the daily growing network architecture, the quantity of network node also grows multiple times. It usually needs plenty of time to finish one analysis work of network structure deployment. Meanwhile, the applied technology such as dynamic router and strategy router also increase the uncertainty of network structure deployment. So, apparently, the conventional network structure analysis method cannot be adapted for the development of the network technology nowadays. Therefore, how to provide a network structure analysis technology that is faster and suitable for large network is the technology topic to be solved by the present invention.

SUMMARY OF THE INVENTION

In view of the above-mentioned various problems, one objective of the present invention is to provide a process system and method for constructing network structure deployment diagram and a computer program product storing the analysis program of the network structure deployment. No hardware cost will be increased and the network structure deployment diagram is easy to be constructed.

Another objective of the present invention is to provide a process system and method for constructing network structure deployment diagram and a computer program product storing the analysis program of the network structure deployment, which can realize the construction of network structure deployment diagram in a fast, highly accurate and efficient manner, especially suitable for large network system with a large amount of network terminals.

To achieve the above objectives and other objectives, the present invention provides a process system and method for constructing network structure deployment diagram and a computer program product storing the analysis program of the network structure deployment. The process system of the present invention for constructing network structure deployment diagram is used to analyze the network structure deployment of the target network, the process system comprising: a request module for transmitting request commands to each network node of the target network, and requesting to obtain the network flow status messages of the connection ports of each of the network nodes in the target network, wherein the network flow status messages may include the following combinations: combination of total input flow value and total output flow value of the connection ports, combination of total input packet value and total output packet value of the connection ports, or combination of total input flow value, total output flow value, total input packet value and total output packet value of the connection ports; a data acquiring module for receiving echo commands that each of the network nodes return based on the request commands, acquiring flag messages corresponding to the connection ports of each of the network nodes in the target network, and anyone of the three present combinations of the network flow status messages mentioned above, and storing the acquired messages in a database; and an analyzing module for performing matching analysis on anyone of the three present combinations of the network flow status messages of each of the connection ports based on the messages stored in the database, so as to determine the connection relation between each of the connection ports, to construct the network structure deployment diagram of the target network.

Preferably, the request module periodically transmits the request command to each of the network nodes of the target network based on a predetermined time period parameter. The data acquiring module further comprises: recording a corresponding acquisition timestamp of the present network flow status messages of each of the connection ports.

Preferably, the data acquiring module acquires the present network flow status messages of each of the connection ports in the target network through the SNMP protocol. By the present invention, users own the authority of the network flow message per unit time of each of the connection ports related to the SNMP protocol. There is no need to request each of the network nodes in the target network to receive and return ICMP packets. Therefore, the construction of the network structure deployment diagram can be finished in the network environment with high security. Besides, since SNMP protocol is a communication protocol that is applied extensively, the cost of the hardware is relatively low in the aspect of realizing the network structure deployment diagram.

Preferably, the data acquiring module further comprises: acquiring the corresponding network node messages of each of the connection ports of each of the network nodes in the target network, and the network nodes and the connection ports have the corresponding relation of one-to-one or one-to-many. The corresponding relation between the network nodes and the connection ports is shown in the network structure deployment diagram generated by the analyzing module.

Preferably, the analyzing module is provided with an algorithm system based on Hadoop, which determines whether there is matching relation by analyzing the network flow status messages of each of the connection ports stored in the database, so as to determine whether any two of the connection ports are physically connected.

Preferably, the analyzing module further comprises: presenting the created network structure deployment diagram in the way of Web.

Moreover, the present invention further provide a process method for constructing network structure deployment diagram, used in analyzing the network structure deployment of the target network by means of the process system for constructing the network structure deployment diagram, the method comprising the following steps: transmitting, by the process system for constructing the network structure deployment diagram, a request command to each of the network nodes of the target network to request obtaining the network flow status messages of the connection ports of each of the network nodes in the target network, wherein the network flow status messages may include the following combinations: combination of total input flow value and total output flow value of the connection ports, combination of total input packet value and total output packet value of the connection ports, or combination of total input flow value, total output flow value, total input packet value and total output packet value of the connection ports; receiving, by the process system for constructing the network structure deployment diagram, echo commands that each of the network nodes return based on the request commands, acquiring flag messages corresponding to the connection ports in the target network and anyone of the three present combinations of the network flow status messages mentioned above, and storing the acquired messages in a database; performing, by the process system for constructing the network structure deployment diagram, matching analysis on anyone of the three present combinations of the network flow status messages of each of the connection ports in the database, to determine the connection relation between each of the connection ports; and constructing, by the process system for constructing the network structure deployment diagram, the network structure deployment diagram of the target network based on the connection relation between each of the connection ports.

Preferably, the process system for constructing a network structure deployment diagram periodically transmits the request command to each of the network nodes of the target network through SNMP protocol based on a predetermined time period parameter to acquire the network flow status messages of the connection ports of each of the network nodes in the target network.

Preferably, the process method further comprising: acquiring, by the process system for constructing a network structure deployment diagram, the corresponding network node messages of the connection ports of each of the network nodes in the target network, and generating the corresponding relation between the connection ports and the network nodes in the network structure deployment diagram of the target network generated subsequently.

Preferably, the process system for constructing a network structure deployment diagram is provided with an algorithm system program based on Hadoop, which determines whether there is matching relation by analyzing the network flow status messages of each of the connection ports stored in the database, so as to determine whether any two of the connection ports are physically connected.

Moreover, the present invention further provide a computer program product storing an analysis program of a network structure deployment, which when loaded and executed, performs the steps of the process method for constructing a network structure deployment diagram.

Compared with the conventional technology, the process system and method for constructing network structure deployment diagram and the computer program product storing the analysis program of the network structure deployment of the present invention utilize the flow message generated when the connection ports of each of the network nodes in the network are communicated point by point, to determine the connection relation between each of the connection ports, thus, without any hardware cost increased, constructing the structure of the deployment diagram of the network with ease of implementation. Especially, when facing a large amount of network nodes, the connection deployment between each of the connection ports of the nodes can be obtained more quickly; therefore it is suitable for large network systems. By using the process system and method for constructing network structure deployment diagram and the computer program product storing a network structure deployment analysis program of the present invention, users do not need to make any change for each network node of the target network. As long as there are complete address of network node (IP) and the access authority of the number of total packets per unit time of the connection ports of each of the network nodes with respect to the SNMP communication protocol, the flow information of all the network nodes can be obtained, and the network structure deployment diagram of the connection ports of all the network nodes can be further obtained.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
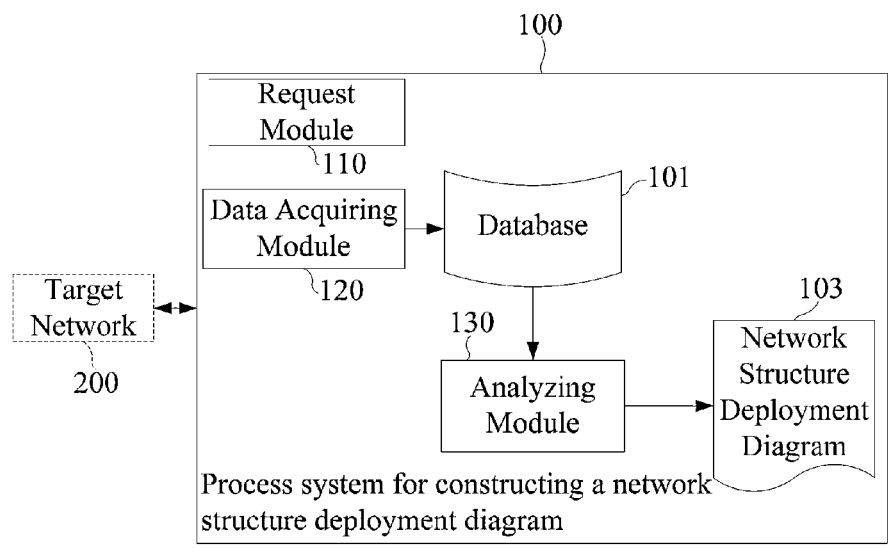
FIG. 1 is the basic system architecture diagram of the process system for constructing the network structure deployment diagram of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Refer to FIG. 1, which is the basic system architecture diagram of the process system for constructing the network structure deployment diagram of the present invention. As shown, the process system 100 for constructing the network structure deployment diagram of the present invention is used for analyzing the network structure deployment, i.e. network topology, of target network 200. In the embodiment, the target network 200 includes a plurality of network nodes. The process system 100 for constructing the network structure deployment diagram of the present invention can be a managing server, for interacting with the plurality of network nodes to construct the network structure deployment diagram of the target network 200. Wherein, the system 100 comprises at least: a request module 110, a data acquiring module 120, and an analyzing module 130.

The request module 110 is used for transmitting request commands to each network node of the target network 200, to request to obtain the network flow status messages of each connection port of each of the network nodes. In this embodiment, the network flow status messages of the connection ports requested by the request module 110 may include the following combinations: combination of total input flow value and total output flow value of the connection ports, combination of total input packet value and total output packet value of the connection ports, or combination of total input flow value, total output flow value, total input packet value and total output packet value of the connection ports (described in detail later). To supplement for the description, the request module 110 of the process system 100 for constructing the network structure deployment diagram of the present invention, obtains the network address of each of the network nodes in advance before transmitting the request commands to each of the network nodes of the target network 200, so that it can interact with each of the network nodes of the target network 200. Besides, the process system 100 for constructing the network structure deployment diagram of the present invention and each of the network nodes of the target network 200 are interacting based on Simple Network Management Protocol (SNMP). Specifically, after receiving the request commands transmitted by the process system 100 for constructing the network structure deployment diagram via the request module 110, each of the network nodes of the target network 200 returns an echo command to the process system 100 for constructing the network structure deployment diagram if the request command is approved. In other words, each of the network nodes of the target network 200 authorizes the process system 100 for constructing the network structure deployment diagram to perform the access process.

Data acquiring module 120 is used for receiving the echo commands returned by each of the network nodes based on the request command, to acquire the corresponding flag messages of each connection port of each of the network nodes in the target network 200 and its present network flow status messages. As described above, since the data acquiring module 120 acquires the present network flow status messages of each connection port in the target network 200 based on SNMP protocol, the data acquiring module 120 explores designated IP list in the target network 200 or all the network resource in the target network 200. The subsequent description takes as an example to explore all the network resource in the target network 200.

Figure 2:
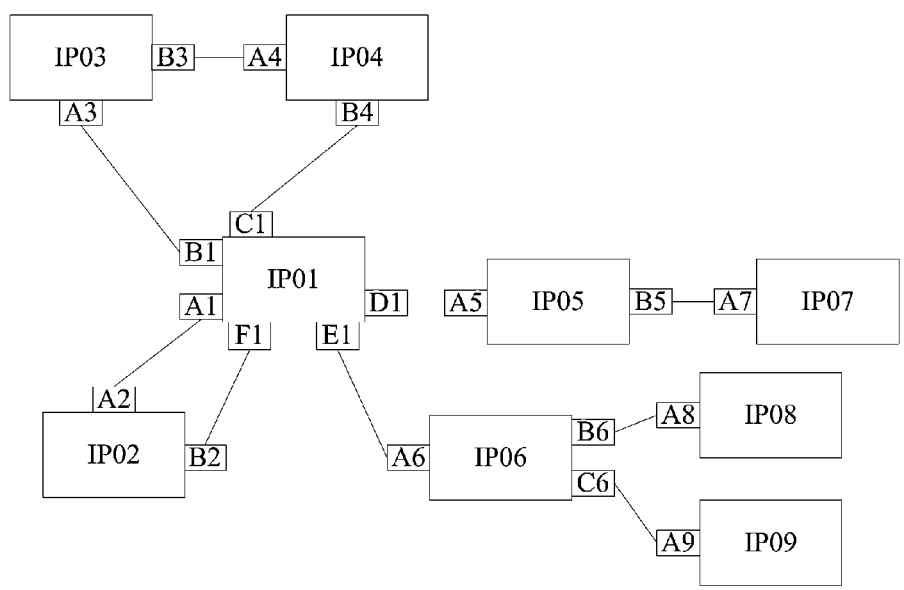
FIG. 2 is a schematic diagram of one embodiment of the network structure deployment diagram created by applying the process system for constructing the network structure deployment diagram of FIG. 1.

Refer to FIG. 2, in this embodiment, the target network 200 is provided with a plurality of network nodes (IP01, IP02, IP03, IP04, IP05, IP06, IP07, IP08 and IP09), each network node having one or more connection ports. For the embodiment shown in FIG. 2, network node IP01 has six connection ports, which are A1, B1, C1, D1, E1 and F1, respectively; network node IP02 has two connection ports A2 and B2. Each of the connection ports has a unique flag messages. Therefore, after receiving the returned echo commands of each network node in the target network 200, the data acquiring module 120 automatically explores in the target network 200 all the resources of the connection ports and the resource of the network node to which the connection ports belong, acquires the corresponding flag messages of each of the connection ports and the messages of the network node to which the connection ports belong, and obtains the present network flow status messages of each of the connection ports, wherein the network flow status messages may include: combination of total input flow value and total output flow value of the connection ports, combination of total input packet value and total output packet value of the connection ports, or combination of total input flow value, total output flow value, total input packet value and total output packet value of the connection ports, and the above-described acquired data messages are all stored in the database 101.

In one preferred embodiment, the request module 110 may repeatedly transmit the request messages to each of the network nodes in the target network 200 based on predetermined time period parameters, such that the data acquiring module 120 periodically acquires the present network flow status messages of the connection ports of each of the network nodes in the target network 200 and records the corresponding acquisition timestamp, so as to increase the accuracy of the analysis results of the process system 100 for constructing the network structure deployment diagram of the present invention.

The analyzing module 130 is used, based on the stored messages in the database 101, for performing matching analysis on the changes of values of the combination of total input flow value and total output flow value of the connection ports, the combination of total input packet value and total output packet value of the connection ports, or the combination of total input flow value, total output flow value, total input packet value and total output packet value, so as to determine the connection relation between each of the connection ports. Specifically, to determine the connection of one testing connection port of one testing network node with some connection port of another network node, the distances between the testing connection port of the testing network node and each of the connection ports of said another network node should be defined. The connection port of the other network nodes which has the shortest distance with the testing connection port of the testing network node is determined to be the two terminals of the connection. In the present invention, the calculation of the connection ports adopts the three data combination methods described above: combination of total input flow value and total output flow value of the connection ports, combination of total input packet value and total output packet value of the connection ports, or combination of total input flow value, total output flow value, total input packet value and total output packet value of the connection ports. Take FIG.

2 as an example, the analyzing module 130 checks, based on the change of value of the total input flow in some period of time stored in the database 101 for connection ports A1 of network node IP01 and the corresponding acquisition timestamp, whether there is any connection port in the database 101 which has a change of value of the total output flow matching with said change of value of the total input flow in the same period of time. Suppose that the connection port A2 of network node IP02 is the connection port which matches with the connection port A1 of the network node IP01, and then it is determined that in the same period, say T1, the change of value of the total input flow of the connection port A2 of network node IP02 matches with the change of value of the total output flow of the connection port A1 of network node IP01, it should be confirmed that there is physical connection relation between the connection port A2 of network node IP02 and the connection port A1 of network node IP01. Of course, to increase the accuracy of the results of the determination, it can be further performed to analyze, in the same period of time described above (T1), whether the change of value of the total output packet of the connection port A2 of network node IP02 matches with the change of value of the total input packet of the connection port A1 of network node IP01. If it is determined that the two values also match with each other, it can be accurately determined that there is physical connection relation between the connection port A2 of network node IP02 and the connection port A1 of network node IP01. Moreover, the analyzing module 130 is provided with an algorithm system based on Hadoop. It utilizes this algorithm system to analyze, in the target network 200, the present network flow status messages of each connection port of each of the network nodes and perform matching. Therefore, even if the amount of the network nodes in the target network 200 is very large, the present invention can obtain the connection deployment of each connection port quickly.

When the matching analysis has been performed on all the connection ports in the target network 200, the analyzing module 130 draws the corresponding network structure deployment diagram 103 of the target network 200 based on the analysis results of the connection relation of each connection port. In this embodiment, the analyzing module 130 presents, in the way of Web, the created network structure deployment diagram 103 (as shown in FIG. 2), and the corresponding relation between each connection port and each network node is also presented in the created network structure deployment diagram 103.

Figure 3:
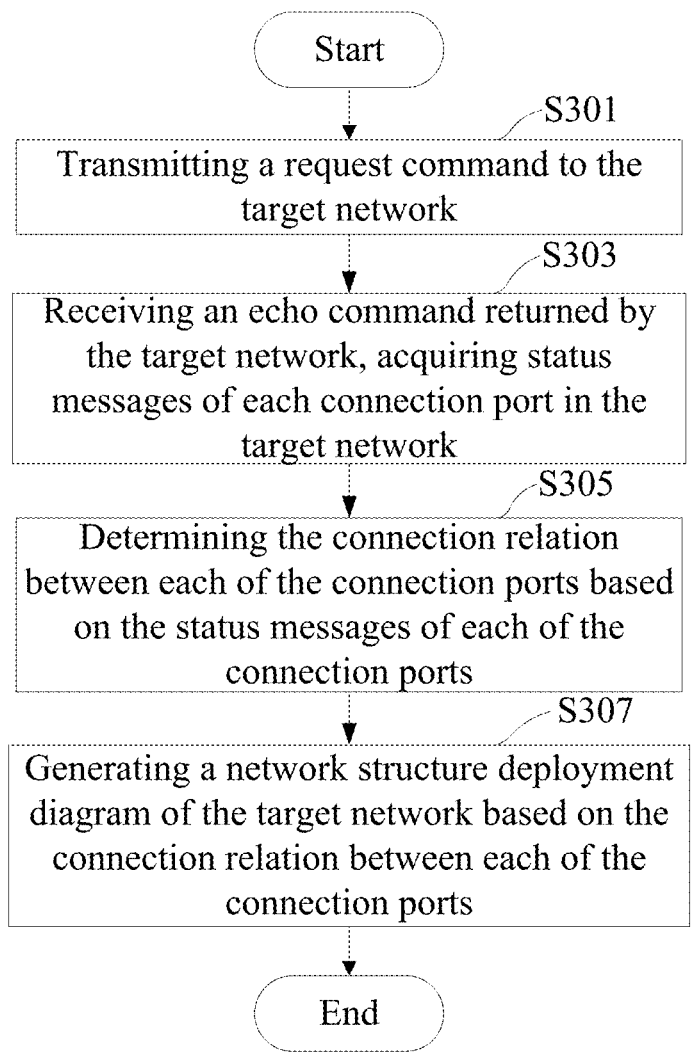
FIG. 3 is the operating flow chart of the analysis method of the network structure deployment of the present invention.

FIG. 3 is the operating flow chart of the process method for constructing a network structure deployment diagram of the present invention, wherein the method analyzes the network structure deployment of the target network 200 by means of the process system 100 for constructing a network structure deployment diagram described above.

As shown in the figure, firstly, step S301 is performed such that the process system for constructing network structure deployment diagram transmits a request command to each network node of the target network, to request to obtain the network flow status messages of each connection port of each of the network nodes in the target network. In this embodiment, the requested network flow status messages include the following three data combination ways: combination of total input flow value and total output flow value of the connection ports, combination of total input packet value and total output packet value of the connection ports, or combination of total input flow value, total output flow value, total input packet value and total output packet value of the connection ports. Then step S303 is performed.

In step S303, the process system for constructing a network structure deployment diagram receives the echo commands returned by each of the network nodes based on the request command, to acquire the corresponding flag messages of each connection port of each of the network nodes in the target network 200 and its present network flow status messages. The network flow status messages include the three data combination ways described above, and the acquired messages described above are stored in a database. In this embodiment, after receiving the request commands transmitted by the process system for constructing the network structure deployment diagram, the network node returns an echo command to the process system for constructing the network structure deployment diagram if the request command is approved. Such that the process system for constructing a network structure deployment diagram can explore the resources of the connection ports in the target network based on SNMP protocol and acquire network flow status messages of each of the connection ports. As shown in FIG. 2, in one embodiment of the present invention, the target network is provided with a plurality of network nodes (IP01, IP02, IP03, IP04, IP05, IP06, IP07, IP08 and IP09), each network node having one or more connection ports. For example, network node IP01 has six connection ports, which are A1, B1, C1, D1, E1 and F1, respectively; network node IP02 has two connection ports A2 and B2. Therefore, after receiving the returned echo commands of each network node, the process system for constructing a network structure deployment diagram automatically explores in the target network 200 all the resources of the connection ports and the resource of the network node to which the connection ports belong, acquires the corresponding flag messages (for example, the corresponding MAC address messages of the connection ports) of each of the connection ports and the messages of the network node to which the connection ports belong, obtains the present network flow status messages of each of the connection ports, and stores the above-described acquired data messages in the database. In another embodiment, to increase the accuracy of the analysis results of the process system 100 for constructing a network structure deployment diagram of the present invention, the present invention can be designed such that the process system for constructing a network structure deployment diagram may periodically transmit the request messages to each of the network nodes in the target network based on predetermined time period parameters, to acquire the network flow status messages of the connection ports of each of the network nodes in the target network many times, so as to increase the accuracy of the analysis results by increasing the acquiring samples. Then step S305.

Figure 4A:
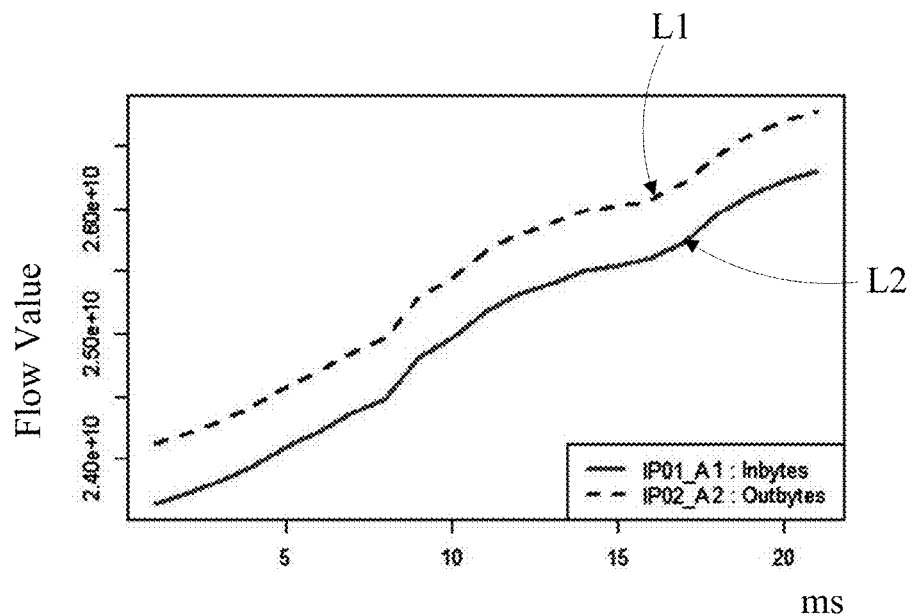
FIG. 4A to 4D are curve diagrams illustrating whether the network flow status messages are matched when the connection ports A1 of network node IP01 and the connection ports A2 of network node IP02 are connected, using the network structure deployment diagram shown in FIG. 2 as an example.
Figure 4B:
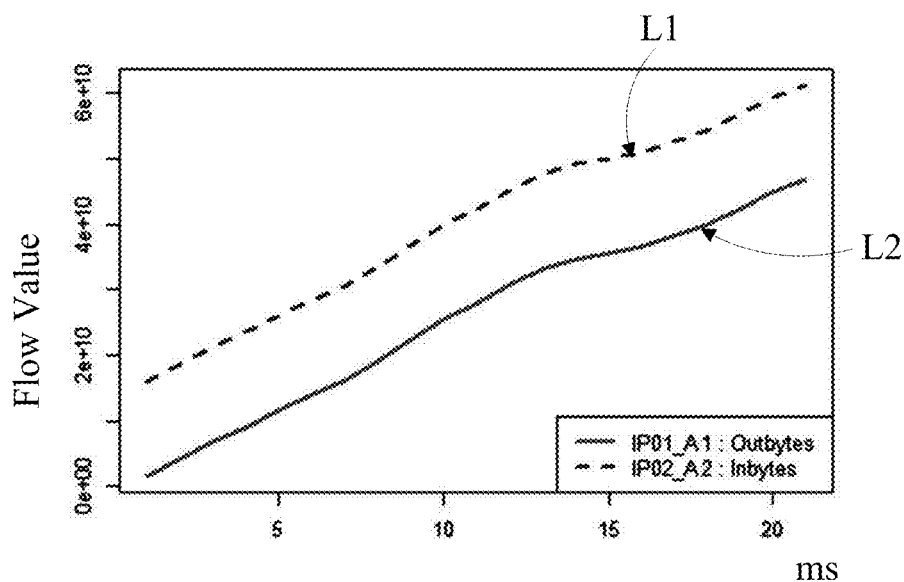
Figure 4C:
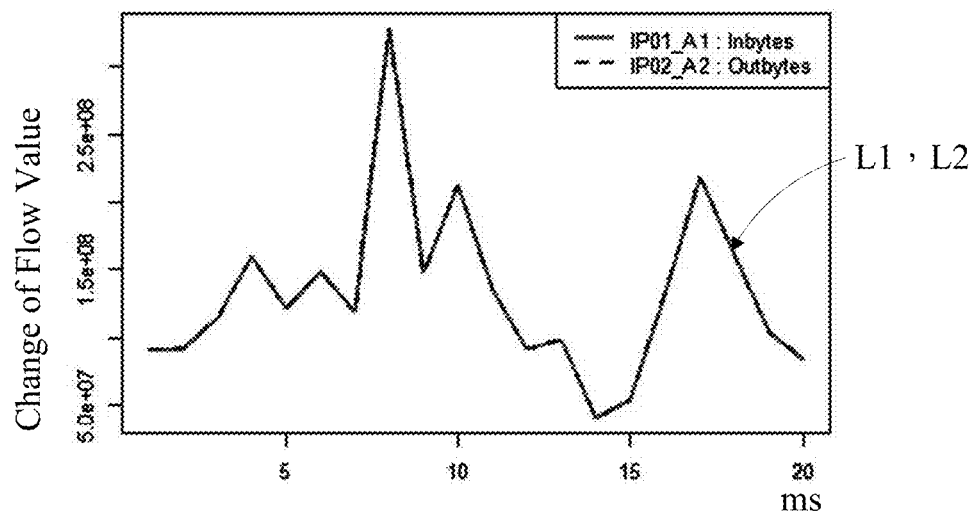
Figure 4D:
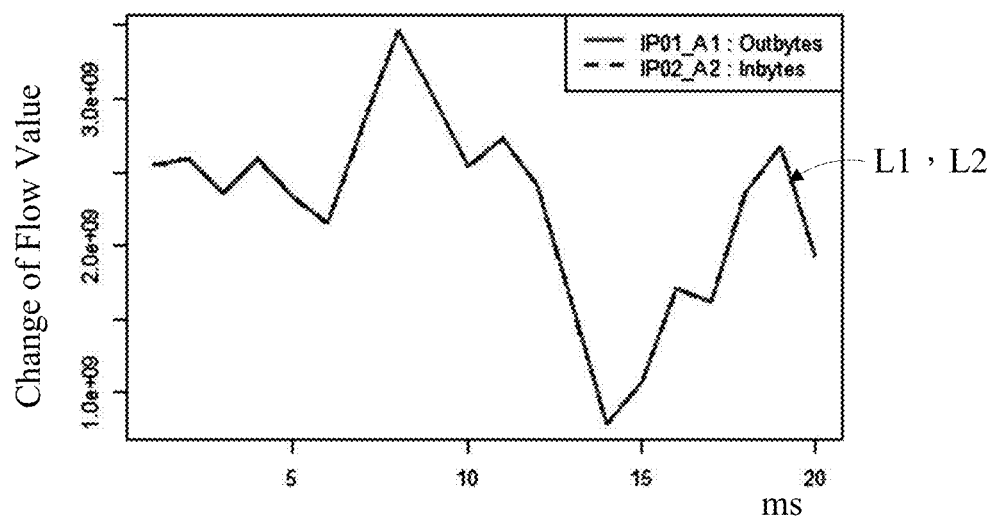

In step S305, the process system for constructing a network structure deployment diagram analyzes the present combination of total input flow value and total output flow value of each of the connection ports, combination of total input packet value and total output packet value of the connection ports, or combination of total input flow value, total output flow value, total input packet value and total output packet value, stored in the database, to determine the connection relation between each of the connection ports. Then step S307 is performed. Specifically, the process system for constructing a network structure deployment diagram, by means of network flow status messages of each connection port stored in the database, analyzes whether the two data of the present total input flow value and total output flow value of two connection ports match each other, or whether the two data of the present total input packet value and total output packet value of said two connection ports match each other, or whether the four data of total input flow value, total output flow value, total input packet value and total output packet value of said two connection ports match each other, so as to determine whether said two connection ports are physically connected to each other. For example, the process system for constructing a network structure deployment diagram may check in the database, based on total input flow value of connection ports A1 of network node IP01 and the corresponding acquisition timestamp stored in the database, whether there is any connection port which has a total output flow value matching with said total input flow value in the same period of time. Suppose that connection port A2 of network node IP02 is the connection port which matches with connection port A1 of network node IP01, and then it is determined that in the same period, say T2, the total output flow value of the connection port A2 of network node IP02 matches with the total input flow value of the connection port A1 of network node IP01, as the curve L2 of the total flow value of connection port A1 of network node IP01 and the curve L1 of the total flow value of connection port A2 of network node IP02 shown in FIG. 4A and FIG. 4B, it should be confirmed from FIG. 4A and FIG. 4B that there is physical connection relation between the connection port A2 of network node IP02 and the connection port A1 of network node IP01. Besides, to increase the accuracy, it can be further performed to analyze, in the same period of time described above (T2), whether the total output packet value of the connection port A2 of network node IP02 also matches with the total input packet value of the connection port A1 of network node IP01. If it is determined that the two values also match with each other, it can be determined that there is physical connection relation between the connection port A2 of network node IP02 and the connection port A1 of network node IP01. In this way, the connection relation of all the connection ports can be analyzed. Moreover, it can also be determined that in the same period of time described above (T2), the change of value of the total output flow of the connection port A2 of network node IP02 matches with the change of value of the total input flow of the connection port A1 of network node IP01. As shown in FIG. 4C and FIG. 4D, the curve L2 of the change of value of the total flow of connection port A1 of network node IP01 coincides with the curve L1 of the change of value of the total flow of connection port A2 of network node IP02, and then it can be further confirmed that there is physical connection relation between the connection port A2 of network node IP02 and the connection port A1 of network node IP01.

Figure 5A:
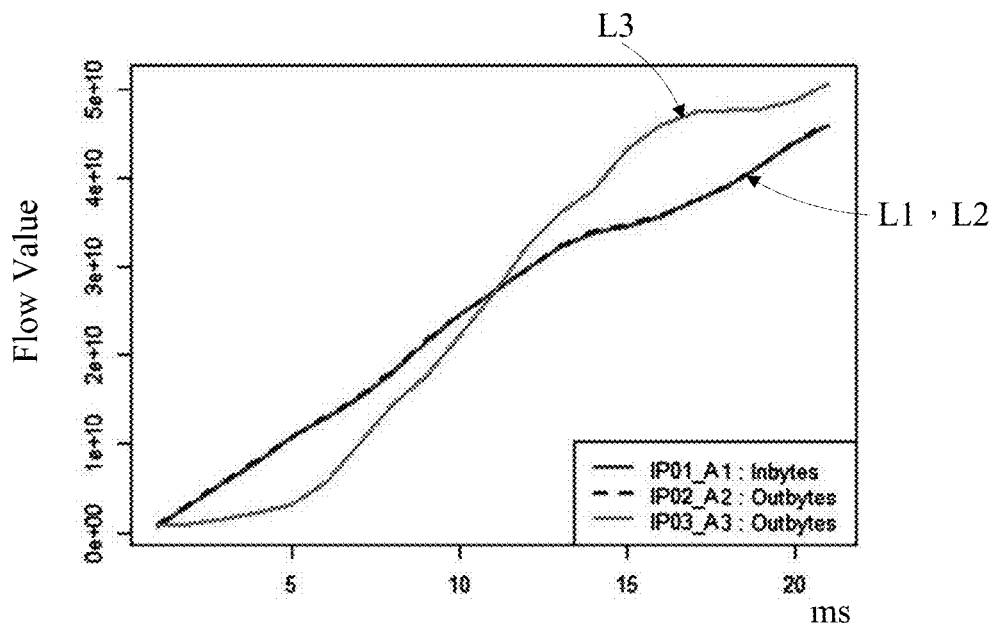
FIG. 5A to 5D are curve diagrams illustrating whether the network flow status messages are matched when the connection ports A1 of network node IP01 and the connection ports A3 of network node IP03 are not connected, using the network structure deployment diagram shown in FIG. 2 as an example.
Figure 5B:
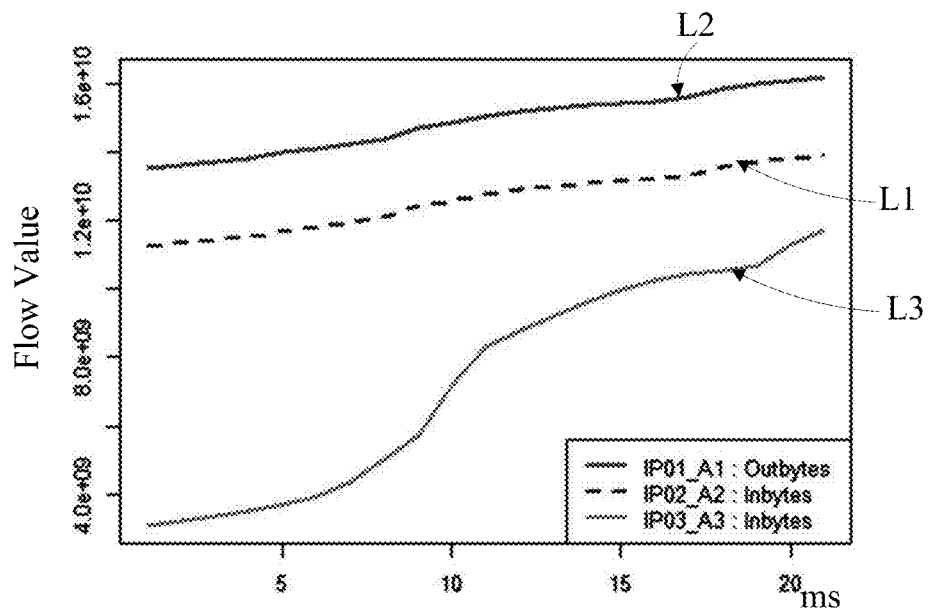
Figure 5C:
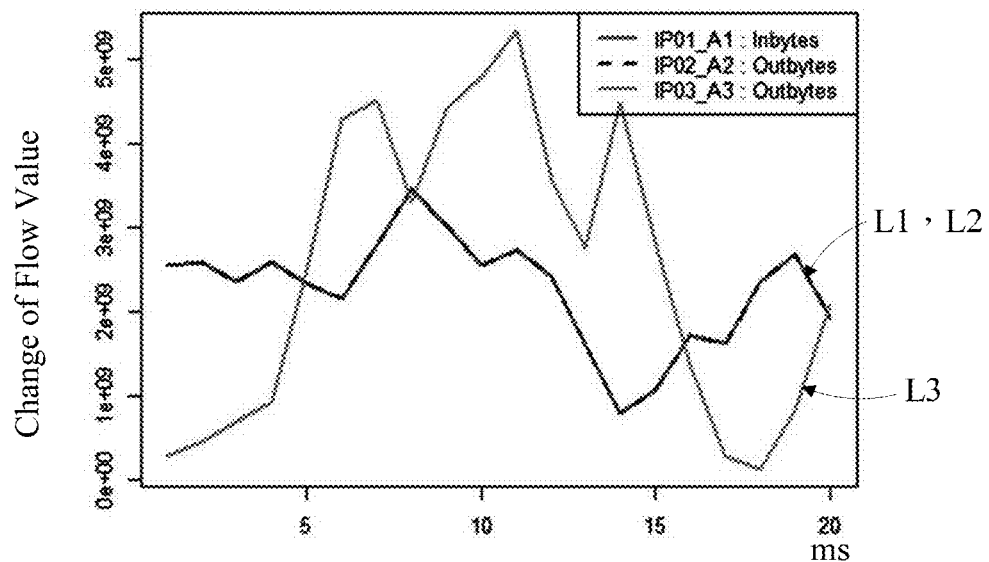
Figure 5D:
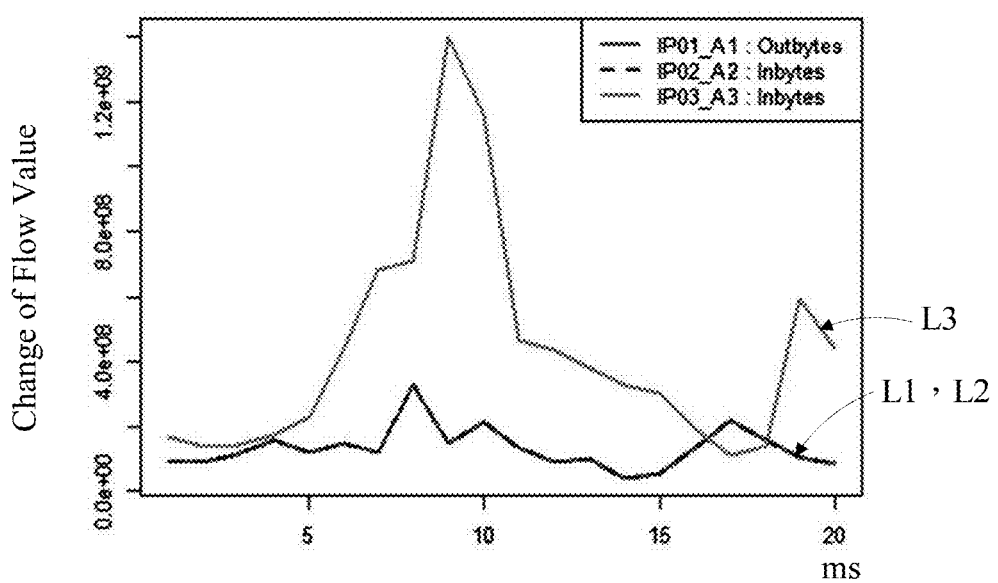

To explain more clearly, still take the network structure deployment diagram shown in FIG. 2 as an example, to explain the results whether or not the presented network flow status messages are matched when the connection ports of the network node are not connected with each other. As shown in FIG. 5A to FIG. 5D, in one unit time period, say T3, the curve L2 of total input flow value of connection port A1 of network node IP01 and the curve L1 of total output flow value of connection port A2 of network node IP02 shown in FIG. 5A are in the status of coincidence, and then it should be confirmed that there is physical connection relation between connection port A2 of network node IP02 and connection port A1 of network node IP01. However, the curve L3 of total output flow value of connection port A3 of network node IP03 does not match with curves L1 and L2 which have the relation of coincidence, and then it should be confirmed that connection port A1 of network node IP01 does not connect with connection port A3 of network node IP03. To be more accurate, another set of network flow status messages can be further analyzed in the same unit time period (T3). It can be known from FIG. 5B, the curve L2 of total output flow value of connection port A1 of network node IP01 has matching relation with the curve L1 of total input flow value of connection port A2 of network node IP02, but the curve L3 of total input flow value of connection port A3 of network node IP03 does not match with the curves L1 and L2 which have the relation of matching. Besides, the change of values of the total flow of the two connection ports can be further analyzed in the same unit time period (T3) described above as shown in FIG. 5C and FIG. 5D. Therefore, it can be known form FIG. 5A to FIG. 5D, connection port A1 of network node IP01 does not connected with connection port A3 of network node IP03.

Besides, the process system for constructing a network structure deployment diagram is also provided with an algorithm system based on Hadoop. It utilizes the algorithm system to analyze the present network flow status messages of each connection port in the database and performs matching. Therefore, even when the amount of the network nodes in the target network 200 is very large, the present invention can also analyzes the connection deployment between each connection port quickly.

In step S307, the process system for constructing a network structure deployment diagram creates, based on the connection relation between each of the connection ports analyzed in step S305, the corresponding network structure deployment diagram of the target network. In this embodiment, the process system for constructing a network structure deployment diagram presents the created network structure deployment diagram in the way of WEB, and also presents, based on the explored corresponding network node of each connection port described above, the corresponding relation between the connection ports and the network node in the network structure deployment diagram.

What is supplemented to explain is that, the application of the process method for constructing a network structure deployment diagram of the present invention can directly perform, through any remote client electrical device, the analysis method of the network structure deployment of the present invention as shown in FIG. 3, i.e., analyzing each of the connection ports of each network node in the target network 200 through the remote client electrical device and the network system (such as Internet). Therefore, the present invention can further provide a computer program product storing the analysis program of the network structure deployment. The computer program product, say client electrical devices such as website servers, performs each step as shown in FIG. 3 through the analysis program of network structure deployment. Moreover, the process method for constructing network structure deployment diagram of the present invention is not limited to the computer program product such as website servers described above. That is, users can directly perform the process method for constructing network structure deployment diagram of the present invention in local terminal devices such as computers. And the way, the terminal device directly performs the process method for constructing network structure deployment diagram of the present invention, is to read and execute, through the terminal device, the analysis program of the network structure deployment stored in the computer readable recording media, such as hard disks, floppy disks, optical disks, or memory sticks, electrically connected to the terminal device. Therefore, the computer program product storing the analysis program of the network structure deployment of the present invention can further include computer readable recording media, such as hard disks, floppy disks, optical disks and memory sticks. That is, the realization methods of constructing the network structure deployment diagram depend on its implementation types.

To summarize, the process system and method for constructing a network structure deployment diagram and the computer program product storing the analysis program of the network structure deployment of the present invention determines the connection relation between each connection ports through acquiring the flow information created when each connection port in the network is performing point-to-point communication and performing matching analysis. There is no need to increase any hardware cost, it is easy to obtain the network structure deployment diagram, and it has the advantage of high efficiency of operation, especially suitable for large network systems with a large amount of network terminals.

While the present invention has been shown and described in connection with the embodiments, it will be apparent to those skilled in the art that modifications and variations can be made without departing from the spirit and scope of the invention as defined by the appended claims.

What is claimed is:

1. A managing server of a target network, which is used for analyzing network connections among a plurality of network nodes target network, said managing server comprising:
a request module, which transmits a request command to each of said network nodes, and requests to obtain network flow status messages of each connection port;
a data acquiring module, which receives an echo command returned by each of said network nodes based on said request command, acquires corresponding flag messages and present network flow status messages of connection ports of said network nodes, and stores said acquired messages in a database of the managing server; and
an analyzing module, which performs a matching analysis on said present network flow status messages of said connection ports based on said stored messages in said database, wherein the matching analysis performs analyzing every two status curves respectively representing said present network flow status messages between two connection ports of different network nodes match with each other in a unit time period, and determining that said two connection ports are connected to each other in the target network when the two status curves are matched, so as to generate a network structure deployment diagram of said target network,
wherein said network flow status messages comprise total input packet values and total output packet values of said connection ports, and the matching analysis performs analysis method of said analyzing module comprises analyzing whether first total input packet values of a first connection port match with second total output packet values of a second connection port in said unit time period, and analyzing whether first total output packet values of said first connection port match with second total input packet values of said second connection port in said unit time period, and determining that said first connection port and said second connection port are connected when both analysis results are matched.

2. The managing server of a target network as recited in claim 1, wherein said request module periodically transmits said request command to each of said network nodes of said target network based on a predetermined time period parameter.

3. The managing server of a target network as recited in claim 2, wherein said data acquiring module further records a corresponding acquisition timestamp of said present network flow status messages of each of said connection ports.

4. The process system as recited in claim 1, wherein said system interacts with each of said network nodes of said target network through SNMP protocol.

5. The managing server of a target network as recited in claim 1, wherein said data acquiring module further acquires the corresponding network node messages of each of said connection ports of each of said network nodes in said target network, and said network nodes and said connection ports have the corresponding relation of one-to-one or one-to-many.

6. The managing server of a target network as recited in claim 5, wherein said corresponding relation between said network nodes and said connection ports is shown in said network structure deployment diagram generated by said analyzing module.

7. The managing server of a target network as recited in claim 1, wherein said analyzing module is provided with an algorithm system based on Hadoop, which determines whether there is matching relation by analyzing said network flow status messages of each of said connection ports stored in said database, so as to determine whether any two of said connection ports are physically connected.

8. The managing server of a target network as recited in claim 1, wherein said network flow status messages comprise total input flow values and total output flow values of said connection ports, and the matching analysis performs analyzing whether first total input flow values of a first connection port match with second total output flow values of a second connection port in said unit time period, and analyzing whether first total output flow values of said first connection port match with second total input flow values of said second connection port in said unit time period, and determining that said first connection port and said second connection port are connected when both analysis results are matched.

9. The managing server of a target network as recited in claim 1, wherein said network flow status messages comprise total input flow values and total output flow values of said connection ports, and the matching analysis performs analyzing whether a change of value of the total input flow of a first connection port matches with a change of value of the total output flow of a second connection port in said unit time period, and analyzing whether a change of value of the total output flow of said first connection port matches with a change of value of the total input flow of said second connection port in said unit time period, and determining that said first connection port and said second connection port are connected when both analysis results are matched.

10. A method for analyzing network connections among a plurality of network nodes a target network, said method comprising:
providing a managing server of the target network to interact with said network nodes, wherein each of said network nodes has one or more connection ports, and each of the connection ports has a unique flag message;
transmitting, by said managing server, a request command to each of said network nodes, requesting to obtain network flow status messages of each connection port;
receiving, by said managing server, an echo command returned by each of said network nodes based on said request command, acquiring corresponding flag messages and present network flow status messages of connection ports of said network nodes, and storing said acquired messages in a database of the managing server;

analyzing, by said managing server, said present network flow status messages of said connection ports in said database to analyze every two status curves respectively representing said present network flow status messages between two connection ports of different network nodes match with each other in a unit time period, and determine that said two connection ports are connected to each other in the target network when the two status curves are matched; and generating, by said managing server, a network structure deployment diagram of said target network based on said network connection among said connection ports built in the analyzing step, wherein said network flow status messages comprise total input packet values and total output packet values of said connection ports, and the analysis method comprises analyzing whether the total input packet values of a first connection port to be analyzed and the total output packet values of a second connection port to be analyzed match with each other in a unit time period, and analyzing whether the total output packet values of said first connection port to be analyzed and the total input packet values of said second connection port to be analyzed match with each other in said unit time period, and determining that said first connection port to be analyzed and said second connection port to be analyzed are connected when both of the analysis results are matching with each other.

11. The method as recited in claim 10, wherein said managing server periodically transmits said request command to each of said network nodes of said target network through SNMP protocol based on a predetermined time period parameter to acquire said network flow status messages of said connection ports of each of said network nodes in said target network.

12. The method as recited in claim 10, further comprising acquiring, by managing server, the corresponding network node messages of said connection ports of each of said network nodes in said target network, and generating the corresponding relation between said connection ports and said network nodes in said network structure deployment diagram of said target network generated subsequently.

13. The method as recited in claim 10, wherein said managing server is provided with an algorithm system program based on Hadoop, which determines whether there is matching relation by analyzing said network flow status messages of each of said connection ports stored in said database, so as to determine whether any two of said connection ports are physically connected.

14. The method as recited in claim 10, wherein said network flow status messages comprise total input flow values and total output flow values of said connection ports, and the analysis method comprises analyzing whether the total input flow values of a first connection port to be analyzed and the total output flow values of a second connection port to be analyzed match with each other in a unit time period, and analyzing whether the total output flow values of said first connection port to be analyzed and the total input flow values of said second connection port to be analyzed match with each other in said unit time period, and determining that said first connection port to be analyzed and said second connection port to be analyzed are connected when both of the analysis results are matching with each other.

15. The method as recited in claim 10, wherein said network flow status messages comprise total input flow values and total output flow values of said connection ports, and the analysis method comprises analyzing whether the change of value of the total input flow of a first connection port to be analyzed and the change of value of the total output flow of a second connection port to be analyzed match with each other in a unit time period, and analyzing whether the change of value of the total output flow of said first connection port to be analyzed and the change of value of the total input flow of said second connection port to be analyzed match with each other in said unit time period, and determining that said first connection port to be analyzed and said second connection port to be analyzed are connected when both of the analysis results are matching with each other.

\* \* \* \* \*